J. S. Kelly,

Peat Machine.

No. 95,806.  Patented Oct. 12, 1869.

Witnesses:
A. W. Almquist
Wm. F. Clark

Inventor:
J. S. Kelly
Per Munn & Co.
Attorneys.

United States Patent Office.

JOHN S. KELLY, OF NEW YORK, N. Y.

Letters Patent No. 95,806, dated October 12, 1869.

---

IMPROVEMENT IN PEAT-MACHINES.

---

The Schedule referred to in these Letters Patent and making part of the same.

---

*To all whom it may concern:*

Be it known that I, JOHN S. KELLY, C. E., of the city, county, and State of New York, have invented a new and useful Improvement in Peat-Machines; and I do hereby declare that the following is a full, clear, and exact description thereof, which will enable others skilled in the art to make and use the same, reference being had to the accompanying drawing, forming part of this specification.

Similar letters of reference indicate corresponding parts.

Figure 1:
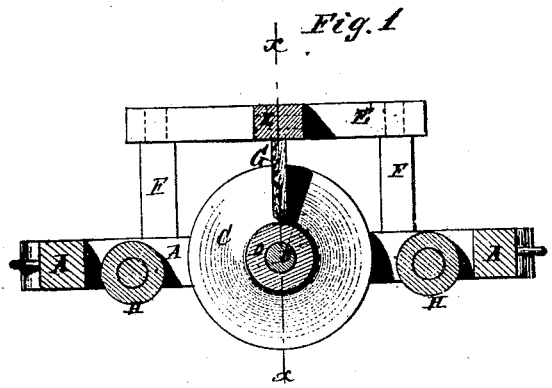
Figure 1 is a vertical longitudinal section of my improved machine.
Figure 2:
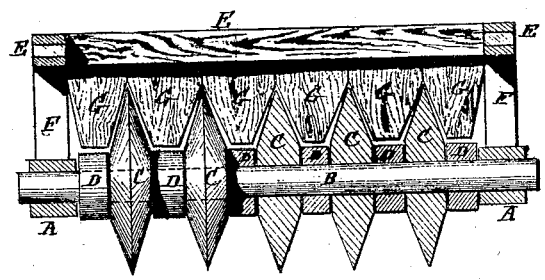
Figure 2 is a detail cross-section of the same, taken through the line $x$ $x$, fig. 1.

My invention has for its object to furnish a simple, convenient, and effective machine for scarping, condensing, and partially drying peat upon the bed, and without removing it therefrom, thereby enabling the peat to be prepared for market at trifling expense; and It consists in the machine constructed and arranged as hereinafter more fully described.

A is the base or main frame of the machine, which is made rectangular in shape, and is formed by framing two end-beams and two side-beams to each other.

B is a shaft or axle, extending across the middle part of the machine, and the ends of which are detachably attached or pivoted to the side-beams of the said frame A.

Upon the shaft B are placed circular cutters C, which revolve loosely upon the said shaft B, and which are kept at the desired distance apart by tubular washers or rollers D, placed and revolving freely upon the shaft B, between the cutters C.

The cutters C are made convex upon both sides, as shown in the drawing, so as not only to cut the fibres of the peat, but also to press or squeeze them together, forcing out the water, and allowing it to escape through the scarp or channels formed by the cutters, to the nearest outlet, or allowing it to be evaporated by the sun.

The number of the cutters C may be increased or diminished, as required, or according to the draught-power to be used, by varying the length of the shaft B, upon which they are placed.

E is the upper frame, which is connected with the frame A, and supported by the standards F.

To the cross-bar of the frame E are attached scrapers G, which are made of such a size and shape as to fit into the spaces between the cutters C, and scrape off the peat that might otherwise adhere to and clog the said cutters.

H are rollers, pivoted to the side-beams, near the ends of the machine, and projecting below the under side of the frame A, so that, should either end of the machine pitch downward, the roller H at that end may come in contact with the surface of the peat, and prevent the machine from sticking fast.

Should the weight of the machine not be sufficient to force it down with sufficient power, a platform or box may be placed upon the frame E, and the machine may be loaded with peat from the bed to any desired weight.

To the middle parts of the end-beams are attached staples, hooks, or other couplings, for the attachment of the power, which may be horse or steam-power, as may be convenient, according to the amount of peat to be operated upon.

In using the machine, it is drawn back and forth across the peat-bed, by drawing alternately upon its ends, cutting the peat, compressing it, and forcing out the water from the porous, fibrous mass. This operation may be continued until the surface has become so condensed that the machine will no longer have any effect upon it.

The peat is then cut transversely, and footed in the same manner as slain-cut peat.

When partially dried, so as to bear handling, it should be clamped on a platform in the ordinary manner, and may be thatched, to protect it from the frost, and at the same time admit the air freely to dry it.

The practical difficulty in the way of introducing peat as an economical fuel, has been the great cost of its preparation, which cost will be very greatly lessened by the use of this machine, so that it may be economically used.

Having thus described my invention,

What I claim as new, and desire to secure by Letters Patent, is—

1. The detachable double-convex circular revolving cutters C, and tubular washers or rollers D, in combination with the shaft B and frame A, substantially as herein shown and described, and for the purpose set forth.

2. The combination of the frame E F and scrapers G, with the frame A, cutters C, and tubular washers or rollers D, substantially as herein shown and described, and for the purpose set forth.

3. The combination of the rollers H, frame A, shaft B, cutters C, tubular washers D, frame E F, and scrapers G, with each other, substantially as herein shown and described, and for the purpose set forth.

The above specification of my invention signed by me, this 8th day of September, 1869.

JOHN S. KELLY, C. E.

Witnesses:
 JNO. F. BROOKS,
 JAMES T. GRAHAM.